United States Patent
Marcos (10) Patent No.: US 11,047,395 B2
(45) Date of Patent: Jun. 29, 2021

(54) FAN STRESS TRACKING FOR TURBOFAN GAS TURBINE ENGINES

(71) Applicant: United Technologies Corporation, Farmington, CT (US)

(72) Inventor: Juan A. Marcos, Middletown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 310 days.

(21) Appl. No.: 16/052,913

(22) Filed: Aug. 2, 2018

(65) Prior Publication Data

US 2019/0063448 A1 Feb. 28, 2019

Related U.S. Application Data (60) Provisional application No. 62/549,696, filed on Aug. 24, 2017.

(51) Int. Cl.
*F04D 27/00* (2006.01)
*F01D 21/14* (2006.01)
(Continued)

(52) U.S. Cl.
CPC ........... *F04D 27/001* (2013.01); *F01D 17/08* (2013.01); *F01D 21/003* (2013.01); *F01D 21/14* (2013.01);
(Continued)

(58) Field of Classification Search
CPC .............................. F04D 27/001; F01D 17/08
(Continued)

(56) References Cited

U.S. PATENT DOCUMENTS 6,449,565 B1 * 9/2002 Budrow ................. G07C 3/00
378/72
9,015,942 B2 4/2015 Care
(Continued)

FOREIGN PATENT DOCUMENTS

| EP | 2055904 | 5/2009 | |
| GB | 2427726 | 1/2007 | |
| WO | WO-2011061141 A1 * | 5/2011 | .......... G01M 5/0033 |

OTHER PUBLICATIONS

Seize Guilhem, Machine Translation of WO-2011061141-A1 (Year: 2011).*

(Continued)

*Primary Examiner* — Ricky Ngon
*Assistant Examiner* — Ricky Go
(74) *Attorney, Agent, or Firm* — Carlson, Gaskey & Olds, P.C.

(57) ABSTRACT

A system for fan stress tracking according to an example of the present disclosure includes, among other things, a computing device that has a memory and a processor. The computing device is operable to execute a data module and a comparison module. The data module is operable to access data corresponding to a sensed value of an engine inlet parameter, and is operable to access data corresponding to a fan stress fatigue ratio profile. The fan stress fatigue ratio profile is defined with respect to at least one fan blade. The comparison module is operable to associate the sensed value of the engine inlet parameter with a stress value according to the fan stress fatigue ratio profile. The comparison module is operable to determine whether the stress value meets at least one predetermined criterion.

19 Claims, 6 Drawing Sheets

(51) Int. Cl.
 *F01D 17/08* (2006.01)
 *F01D 21/00* (2006.01)
 *G01N 7/00* (2006.01)

(52) U.S. Cl.
 CPC ......... *G01N 7/00* (2013.01); *F05D 2220/323* (2013.01); *F05D 2220/36* (2013.01); *F05D 2260/83* (2013.01); *F05D 2270/114* (2013.01)

(58) Field of Classification Search
 USPC .......................................................... 702/34
 See application file for complete search history.

(56) References Cited

U.S. PATENT DOCUMENTS

| | | |
|---|---|---|
| 2004/0258520 A1 | 12/2004 | Parry |
| 2011/0137575 A1* | 6/2011 | Koul .................. G05B 23/0283 702/34 |
| 2014/0052410 A1 | 2/2014 | Tralshawala et al. |
| 2014/0288855 A1* | 9/2014 | Deshpande ........... F03D 7/0292 702/34 |
| 2015/0081229 A1* | 3/2015 | Yu ........................... F01D 21/14 702/33 |
| 2015/0240788 A1 | 8/2015 | Kayama et al. |
| 2016/0103012 A1* | 4/2016 | Liu ........................ F04D 27/02 702/33 |
| 2018/0340542 A1* | 11/2018 | Sundararajan ........ F04D 27/001 |

OTHER PUBLICATIONS

European Search Report for European Patent Application No. 18190755 completed Jan. 3, 2019.

* cited by examiner

FAN STRESS TRACKING FOR TURBOFAN GAS TURBINE ENGINES

CROSS-REFERENCE TO RELATED APPLICATION

This application claims priority to U.S. Provisional Patent Application No. 62/549,696 filed Aug. 24, 2017.

BACKGROUND

The present disclosure relates to fan sections for gas turbine engines, and more particularly to stress tracking of rotating airfoils such as fan blades during engine operation.

Gas turbine engines are known, and typically include a fan having a plurality of fan blades delivering air into a low pressure compressor section. The air is compressed in the low pressure compressor section, and passed into a high pressure compressor section. From the high pressure compressor section the air is introduced into a combustor section where it is mixed with fuel and ignited. Products of this combustion pass downstream over a high pressure turbine section, and then a low pressure turbine section to extract energy for driving the fan.

The fan blades may be experience stress during some operating conditions, including relatively strong crosswind or tailwind conditions. In some scenarios, flight and/or takeoff envelopes dependent on fan stress characteristics may restrict operation of the aircraft.

SUMMARY

A system for fan stress tracking according to an example of the present disclosure includes a computing device that has a memory and a processor. The computing device is operable to execute a data module and a comparison module. The data module is operable to access data corresponding to a sensed value of an engine inlet parameter, and is operable to access data corresponding to a fan stress fatigue ratio profile. The fan stress fatigue ratio profile is defined with respect to at least one fan blade. The comparison module is operable to associate the sensed value of the engine inlet parameter with a stress value according to the fan stress fatigue ratio profile. The comparison module is operable to determine whether the stress value meets at least one predetermined criterion.

In a further embodiment of any of the foregoing embodiments, the at least one predetermined criterion includes at least one fan stress fatigue ratio threshold.

In a further embodiment of any of the foregoing embodiments, the at least one fan stress fatigue ratio threshold includes a first threshold corresponding to a fan stress fatigue ratio having a numerical value of less than 1.0.

In a further embodiment of any of the foregoing embodiments, the at least one fan stress fatigue ratio threshold includes a second threshold corresponding to a fan stress fatigue ratio of about 1.0.

In a further embodiment of any of the foregoing embodiments, the computing device is operable to execute an accumulator module. The accumulator module is operable to accumulate an elapsed fan stress tracking time that the at least one predetermined criterion is met.

In a further embodiment of any of the foregoing embodiments, the accumulator module is operable to accumulate a total elapsed time defined as the elapsed fan stress tracking time for each of two or more flight cycles.

In a further embodiment of any of the foregoing embodiments, the engine inlet parameter corresponds to inlet pressure at a location in an engine inlet, and the fan stress fatigue ratio profile is defined with respect to a difference between the inlet pressure and ambient pressure.

In a further embodiment of any of the foregoing embodiments, the at least one predetermined criterion includes at least one disturbance threshold defined with respect to the inlet pressure.

In a further embodiment of any of the foregoing embodiments, the data module is operable to communicate with at least one probe operable to sense the inlet pressure.

A gas turbine engine according to an example of the present disclosure includes a fan section that has a fan, a fan stress tracking assembly that has at least one probe situated in the fan section, and a controller in communication with the at least one probe. The controller is operable to receive a sensed value of an engine inlet parameter relating to the engine inlet, is operable to associate the sensed value of the engine inlet parameter with a stress value according to a fan stress fatigue ratio profile, the fan stress fatigue ratio profile defined with respect to the fan, and is operable to determine whether the stress value meets at least one predetermined criterion.

In a further embodiment of any of the foregoing embodiments, the engine inlet parameter corresponds to inlet pressure at a location in the engine inlet, and the fan stress fatigue ratio profile is defined with respect to a difference between the inlet pressure and ambient pressure.

In a further embodiment of any of the foregoing embodiments, the location is axially forward of the fan with respect to the engine axis.

In a further embodiment of any of the foregoing embodiments, the at least one predetermined criterion includes at least one disturbance threshold defined with respect to the inlet pressure, and includes two or more fan stress fatigue ratio thresholds.

In a further embodiment of any of the foregoing embodiments, the two or more fan stress fatigue ratio thresholds include a first threshold, a second threshold and a third threshold. The first threshold corresponds to a fan stress fatigue ratio that has a numerical value between 0.6 and 1.0. The second threshold corresponds to a fan stress fatigue ratio between 1.0 and 1.2. The third threshold corresponds to a fan stress fatigue ratio that has a numerical value of greater than 1.2.

In a further embodiment of any of the foregoing embodiments, the controller is operable to accumulate an elapsed fan stress tracking time that the at least one predetermined criterion is met, and is operable to accumulate a total elapsed time. The total elapsed time is the elapsed fan stress tracking time for each of two or more flight cycles of the engine.

In a further embodiment of any of the foregoing embodiments, the at least one predetermined criterion includes a weight-on-wheel condition, a predefined airspeed threshold of an aircraft associated with the engine, and a predefined rotational speed threshold of the fan.

A method of tracking fan stress for a gas turbine engine according to an example of the present disclosure includes providing a fan section including a fan, associating a sensed value of an engine inlet parameter with a stress value for the fan according to a fan stress fatigue ratio profile, and determining whether the stress value meets at least one predetermined criterion.

A further embodiment of any of the foregoing embodiments includes defining the fan stress fatigue ratio profile with respect to one or more characteristics of the fan.

In a further embodiment of any of the foregoing embodiments, the step of associating includes determining a difference between the sensed value of the engine inlet parameter and a sensed value of an ambient pressure parameter.

A further embodiment of any of the foregoing embodiments includes accumulating an elapsed fan stress tracking time when the at least one predetermined criterion is met. The predetermined criterion includes at least one fan stress fatigue ratio threshold.

Although the different embodiments have the specific components shown in the illustrations, embodiments of this disclosure are not limited to those particular combinations. It is possible to use some of the components or features from one of the embodiments in combination with features or components from another one of the embodiments.

The various features and advantages of this invention will become apparent to those skilled in the art from the following detailed description of an embodiment. The drawings that accompany the detailed description can be briefly described as follows.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION

Figure 1A:
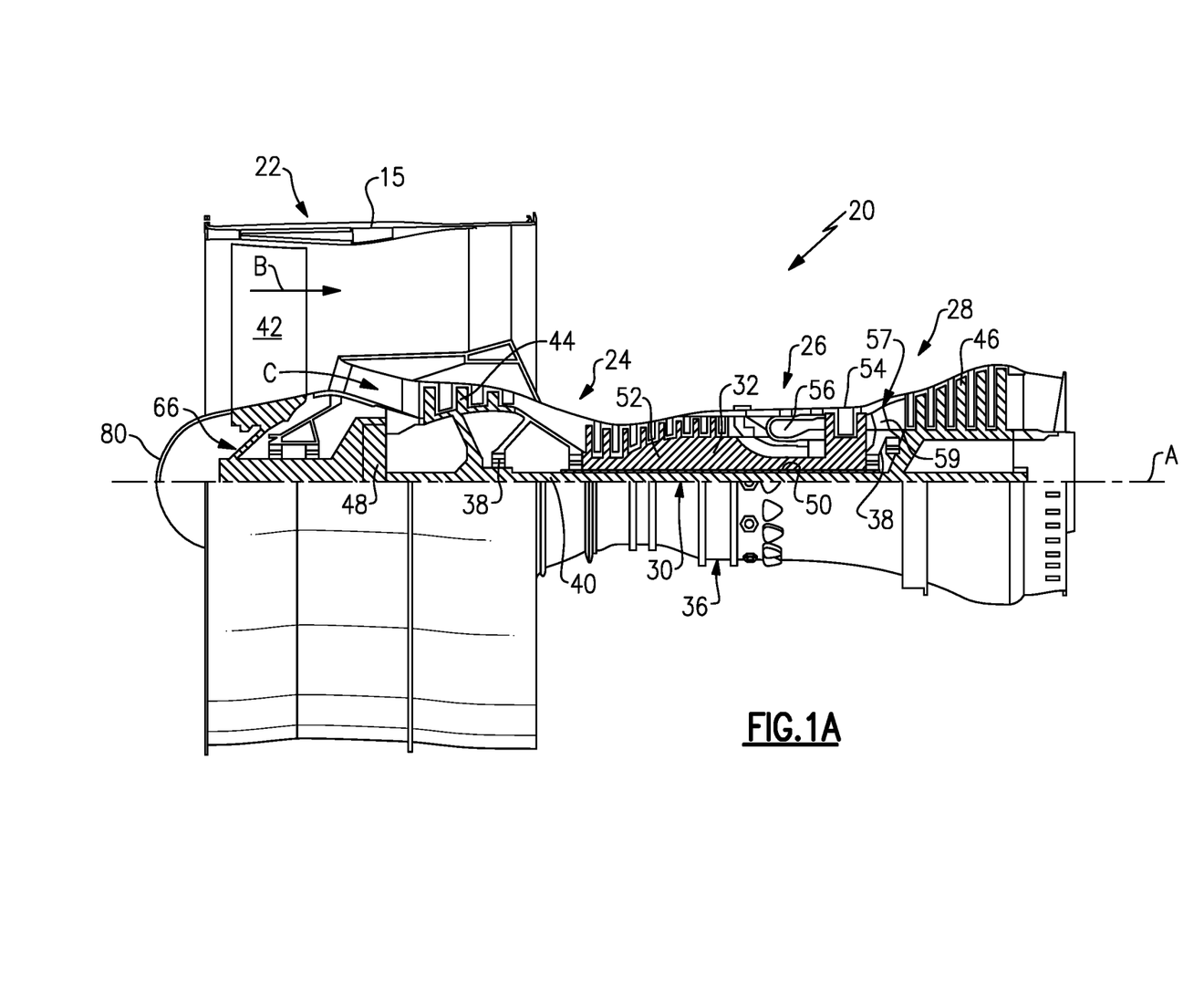
FIG. 1A shows an exemplary gas turbine engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle or fan case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one embodiment is a high-bypass geared aircraft engine. In a further embodiment, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans, and three shaft turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 1B:
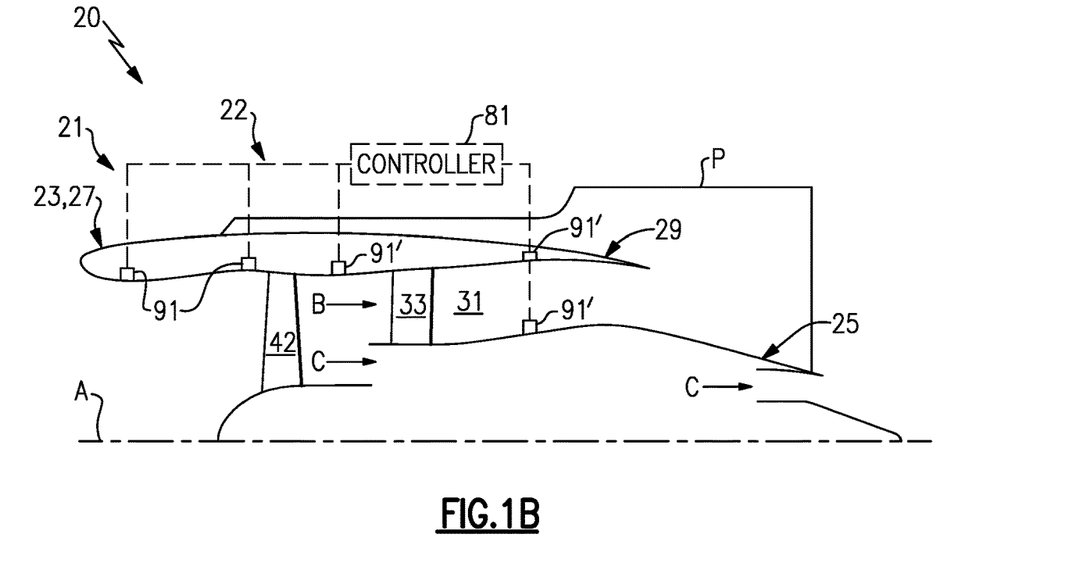
FIG. 1B is a schematic view of the engine of FIG. 1A and a nacelle assembly, according to an embodiment.

FIG. 1B illustrate a highly schematic view of a nacelle assembly 21 for the engine 20 of FIG. 1A. The nacelle assembly 21 includes a fan nacelle 23 and a core cowling 25 arranged coaxially about the engine axis A. The fan nacelle 23 and the core cowling 25 define outer flow surfaces of the nacelle assembly 21. The nacelle assembly 21 defines an engine inlet 27 that delivers airflow to the fan 42. The fan nacelle 23 at least partially surrounds the fan 42, and extends along the engine axis A between the engine inlet 27 and a nozzle exit 29. The core cowling 25 is arranged downstream of the fan 42 to guide a portion of the fan airflow to the core flow path C. The core cowling 25 is supported within the fan nacelle 23 by one or more circumferentially spaced structures or fan exit guide vanes (FEGV) 33. The fan nacelle 23 at least partially surrounds the core cowling 25 to define a generally annular bypass duct 31 configured to communicate bypass airflow B from the fan 42. The bypass airflow B communicates through the bypass duct 31 and is discharged through the nozzle exit 29 between the fan nacelle 23 and the core cowling 25. The nacelle assembly 21 can be mechanically attached to an aircraft via pylon P.

Figure 2:
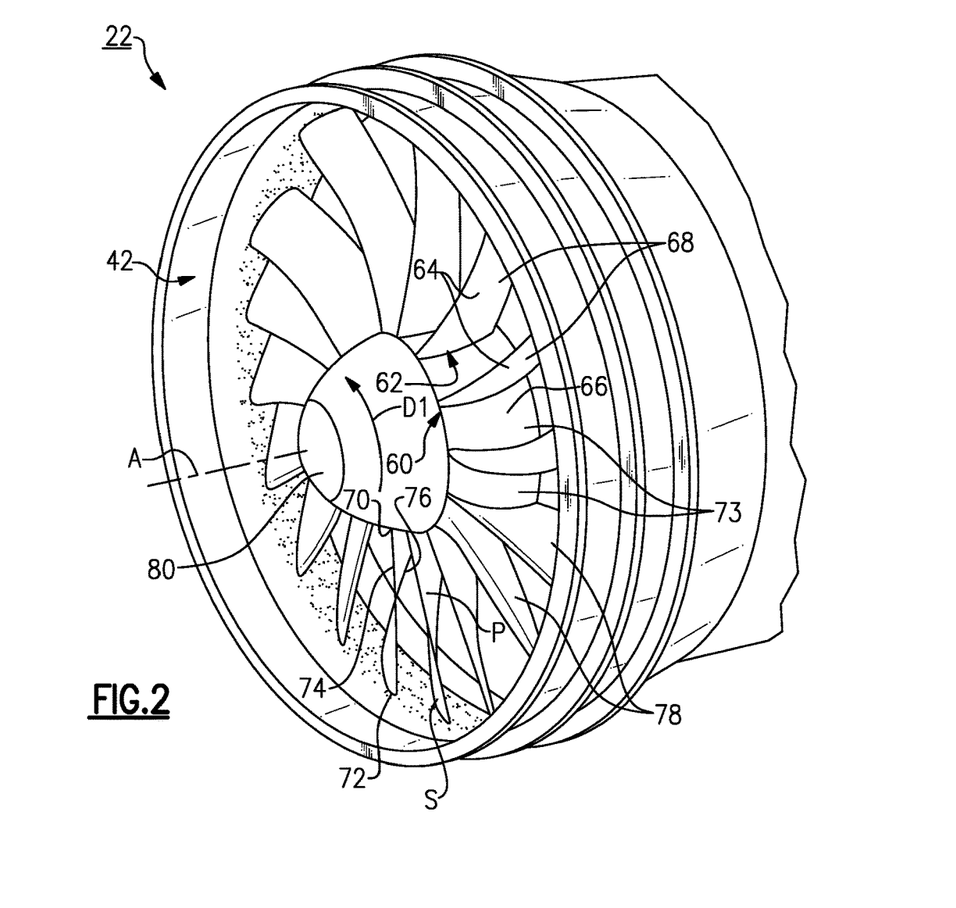
FIG. 2 is a perspective view of a fan section of the engine of FIG. 1A.

FIG. 2 illustrates aspects of the fan section 22. The fan 42 includes a rotor 60 having an array or row 62 of rotatable airfoils or fan blades 64 that extend circumferentially around and are supported by a fan hub 66. Any suitable number of fan blades 64 may be used in a given application, such as 26 or fewer fan blades, or more narrowly between 12 and 20 fan blades. Although only one (or a forwardmost) row 62 of fan blades 64 is shown, the teachings herein can apply to engine arrangements having two or more rows of fan blades.

The fan hub 66 is rotatable in a direction D1 about the engine axis A. The direction D1 can be clockwise or counterclockwise with respect to the engine axis A. Each of the fan blades 64 includes an airfoil section 68 that extends in a radial or spanwise direction from the hub 66 between a root portion 70 and a tip portion 72, in a chordwise direction (axially and circumferentially) between a leading edge 74 and a trailing edge 76, and in a thickness direction between a pressure sidewall P and a suction sidewall S. The pressure sidewall P and the suction sidewall S are spaced apart and generally meet together at both the leading and trailing edges 74, 76.

Each fan blade 64 has an exterior surface 78 providing a contour that extends in the chordwise direction from the leading edge 74 to the trailing edge 76. The exterior surface 78 generates lift based upon its geometry and directs flow along the core flow path C and bypass flow path B (FIG. 1A). The fan blade 64 may be constructed from a composite material, an aluminum or titanium alloy, or a combination of one or more of these, for example. Abrasion-resistant coatings or other protective coatings may be applied to the fan blade 64.

The root portion 70 is received in a correspondingly shaped slot in the hub 66. The airfoil section 68 extends radially outward of a platform 73, which provides the inner flow path. The platform 73 may be integral with the blade 64 or separately secured to the hub 66, for example. In some examples, the fan blade 64 is joined or machined integral with the hub 66 to form an integrally bladed rotor (IBR). A spinner 80 is supported relative to the hub 66 to provide an aerodynamic inner flow path into the fan section 22.

It may be desirable to determine an amount of time that each fan blade 64 is exposed to operating conditions that may cause fan blade stress. For example, the fan blades 64 may experience stress during conditions that are associated with a relatively high fan stress fatigue ratio (FSFR), such as relatively strong crosswinds or tailwinds that may cause distorted engine inlet or exit flow. In such conditions, some engine operating instruction manuals may restrict ground speed during takeoff, for example. For the purposes of this disclosure, the term "fan stress fatigue ratio" is the ratio of the highest local stress in any portion of the fan blade compared to the cyclic fatigue strength for 10 million cycles. The fatigue strength is a function of the fan blade material and construction and is the stress that causes cyclic fatigue damage to the blade. At sustained 100% or higher FSFR the fan blade will incur fatigue damage and develop a crack. Typically the allowable highest FSFR is lower than 100% to account for variability in the material properties and the construction of individual blades and the uncertainty of measurements. If the highest measured FSFR is lower than the allowed, the fan blade is considered to have infinite fatigue life, however if the engine is operated at crosswinds or tailwinds conditions that cause the measured stress to be higher than the allowed FSFR, then the operation must be restricted or the operation tracked to ensure that the fan blades do not incur fatigue damage.

Figure 3:
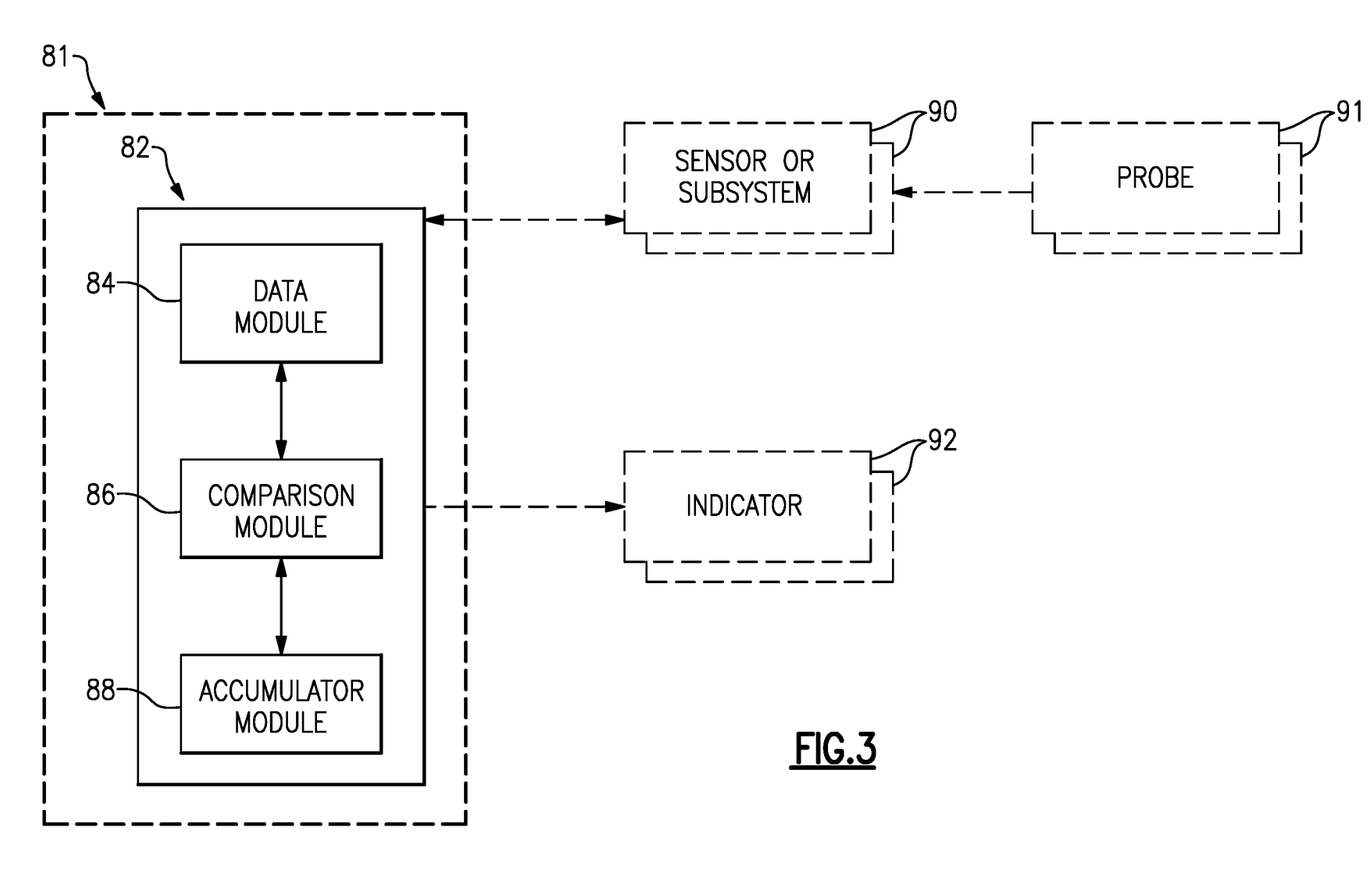
FIG. 3 illustrates a system for fan stress tracking, according to an embodiment.

Referring to FIG. 3, with continued reference to FIGS. 1A-1B and 2, a fan stress tracking system or assembly 82 configured for stress tracking of rotatable airfoils and fan blades is shown. The assembly 82 may be incorporated into a controller 81 in communication with various subsystems of the engine 20 and/or aircraft. In some embodiments, assembly 82 may be located within the aircraft, or remote from the engine 20. The assembly 82 is operable to determine whether each fan blade 64 of the fan 42 is likely to experience undesired level(s) of stress, and to accumulate an elapsed amount of time that each fan blade 64 operates at the undesired level(s). The techniques disclosed herein can be utilized to increase a flight envelope during takeoff, for example. Although system 82 is primarily discussed with respect to stress tracking of fan blades, the teachings herein may benefit other portions of engine 20, such as rotatable airfoils in the compressor section 24. Other systems may also benefit from the teachings herein, such as land-based industrial turbine applications and military engine applications.

The fan stress tracking assembly 82 includes a data module 84 in communication with a comparison module 86 and an accumulator module 88. The data module 84 communicates with one or more subsystems or sensors 90 to access various data or information relating to operation of the engine 20, fan case 15 and/or aircraft, for example. The information includes sensed value(s) of one or more engine inlet parameters, such as ambient pressure and inlet pressure at the engine inlet 27. Sensed ambient pressure values may be provided from a subsystem of the aircraft, for example. In some embodiments, the information includes a rotational speed of the fan 42, airspeed or velocity of an aircraft associated with the engine 20, and a weight-on-wheels condition of the aircraft with respect to weight of the airframe on the wheels or landing gear of the aircraft.

One or more of the sensors 90 can be coupled to one or more probes 91, which are in communication with the controller 81. The sensors 90 can be temperature or pneumatic pressure sensors, for example. At least one probe 91 is positioned or situated in the fan section 22. In the illustrated embodiment of FIG. 1B, one or more probes 91 (two shown for illustrative purposes) are positioned in the fan section 22 at a location in the engine inlet 27. The location of the probe 91 can be axially forward of the fan 42 with respect to the engine axis A, or can be axially aft of the fan 42 as depicted by probes 91'. Probe 91' may experience pressure attenuation or distortion due to a relative location to the fan 42. Accordingly, an attenuation factor can be applied to the sensed pressure at a location of the probe 91' to adjust for distortion. Each probe 91, 91' is operable to sense an inlet pressure at a location in the engine inlet 27.

The data module 84 is operable to access data corresponding to at least one FSFR profile. The FSFR profile is defined with respect to one or more characteristics of the fan section 22 or fan 42, such as one or more of characteristics of the fan blades 64. Example characteristics can include airfoil geometry such as surface contouring, lean, sweep, twist and/or camber, and solidity defined by neighboring airfoils. Other example characteristics can include airfoil construction, including materials forming the fan blades 64, and geometry of the fan case 15 and bypass flow path B (FIGS. 1 and 2).

Each fan stress fatigue ratio profile can be defined as a function of one or more operating characteristics of the fan section 22. The fan stress fatigue ratio profile can be expressed as a parametric equation or relationship based on observed or estimated data for similar fan and engine configurations.

Figure 4:
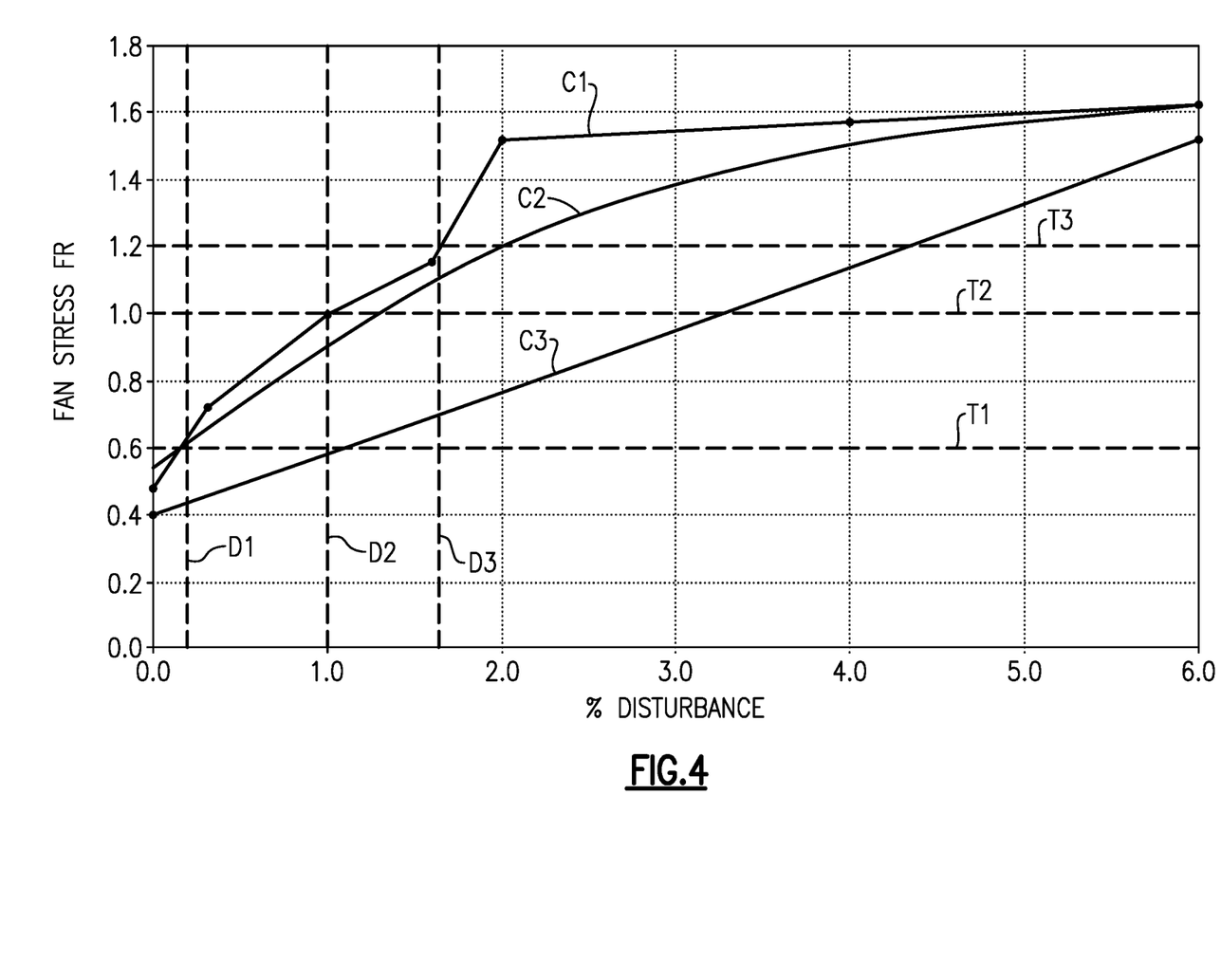
FIG. 4 illustrates a plot depicting exemplary fan stress fatigue ratio curves.

Example curves C1, C2 and C3 that correspond to different FSFR profiles are shown in FIG. 4. Each curve C1, C2 and C3 includes a set of FSFR values defined as a function of, or with respect to, disturbance in the engine inlet 27. The FSFR profile can be a linear relationship, as illustrated by curve C3, by a non-linear relationship, as illustrated by curve C2, or a complex non-linear relationship, as illustrated by curve C1, for example.

Each FSFR profile can be defined with respect to inlet pressure and ambient pressure. For example, the disturbance can be defined as an absolute difference between inlet pressure and ambient pressure, with the difference expressed in FIG. 4 as a percentage of the ambient pressure. For example, a sensed inlet pressure that is equal to a sensed ambient pressure yields a disturbance value of 0.0, and a sensed inlet pressure that is less than a sensed ambient pressure yields a disturbance value less than 0.0. These can also be inverted to be positive for computation convenience.

One or more predetermined disturbance correlations or thresholds can be established to characterize the calculated disturbance values. In the illustrated embodiment of FIG. 4, first, second and third disturbance thresholds D1, D2 and D3 (shown in dashed lines) are established, and can be defined with respect to inlet pressure of the engine inlet 27, for example. The first disturbance threshold D1 may be established to filter noise including relatively small fluctuations in inlet pressure, for example. The second disturbance threshold D2 may be associated with moderate disturbances, and the third disturbance threshold D3 may be associated with relatively severe disturbances, such as relatively high velocity crosswinds or tailwinds.

FSFR values can be expressed as a ratio or percentage of an FSFR of 1.0. One or more predetermined FSFR thresholds can be established to characterize the set of FSFR values. In the illustrated embodiment of FIG. 4, first, second and third FSFR thresholds T1, T2 and T3 (shown in dashed lines) establish a multi-tier approach based on FSFR severity. The first FSFR threshold T1 corresponds to an having a numerical value less than about 1.0, such as 0.6, the second FSFR threshold T2 corresponds to an FSFR of about 1.0, and the third FSFR threshold T3 corresponds to an FSFR having a numerical value greater than about 1.0, such as 1.2.

The FSFR values can be associated with expected conditions in which a fan blade may degrade or become damaged. For example, an FSFR value of greater than 1.0 (or 100%) may be associated with a condition in which an average fan blade is expected to begin to experience degradation or damage. Damage may include fatigue caused by vibration of the fan blade. Fatigue may cause one or more cracks to form, which may grow and cause liberation of the fan blade over a period of flight cycles. An FSFR value of greater than 1.2 (or 120%) may be associated with a relatively serious condition in which most fan blades are expected to experience damage in relatively fewer flight cycles.

The comparison module 86 is operable to receive a sensed value of an engine inlet parameter relating to the engine inlet 27, and to associate the sensed value of the engine inlet parameter with a stress value according to the respective FSFR profile established for the fan 42. The comparison module 86 is operable to determine whether the stress value meets at least one predetermined criterion. Predetermined criteria can include any of the information or data disclosed herein, including one or more of FSFR thresholds and disturbance thresholds D1, D2 that can be defined with respect to inlet pressure, for example. Other predetermined criteria can include a predefined rotational speed threshold that is compared to a rotational speed of the fan 42 (e.g., greater than 80% maximum rotational speed), a predefined airspeed threshold that is compared to airspeed or velocity of an aircraft associated with the engine 20 (e.g., less than 35 knots), and a weight-on-wheels condition of the aircraft (e.g., threshold being weight on wheels such as during takeoff).

Each FSFR profile can be stored in memory of the controller 81 as one or more data entries, formulaic relationships, or lookup tables with respect to disturbance values. The comparison module 82 is operable to cause the data module 84 to access data corresponding to the FSFR profile to obtain an associated FSFR value, and can cause the data module 84 to access data corresponding to the one or more predetermined FSFR and/or disturbance thresholds.

The accumulator module 88 is operable to accumulate an elapsed fan stress tracking time that the at least one predetermined criterion is met. The accumulator module 88 may accumulate an elapsed fan stress tracking time for a single flight cycle, or for more than one flight cycle. For example, the accumulator module 88 may be operable to accumulate a total elapsed time defined as an elapsed fan stress tracking time for each of two or more flight cycles. For the purposes of this disclosure, the term "flight cycle" means engine operation between a single takeoff and landing.

In some embodiments, the accumulator module 88 accumulates an elapsed fan stress tracking time and/or a total elapsed time with respect to one or more of the FSFR thresholds T1, T2, T3. For example, the accumulator module 88 may accumulate a total elapsed time for FSFR values between the FSFR thresholds T1, T2, between the FSFR thresholds T2, T3, and/or above the FSFR threshold T3. The elapsed time may be measured in seconds, for example.

The accumulated elapsed time data may be stored in memory and utilized by maintenance crew to determine whether to conduct maintenance operations, such as inspection or replacement of one or more of the fan blades 64, for example. In some embodiments, the comparison module 86 or accumulator module 88 is operable to cause one or more indicators 92 to be generated when the predetermined criterion is met, and/or when the elapsed fan stress tracking time and/or total elapsed time is above a predetermined time threshold. The indicators 92 can include a visual or audible warning to the cockpit or crew, for example. In some embodiments, the indicators 92 include one or more flags or maintenance indicators to alert maintenance crews that the fan 42 or fan blades 64 have been operated outside of the desired limits and thresholds discussed herein. In further embodiments, the maintenance indicators require clearing by maintenance personnel once the maintenance indicators have been set.

Figure 5:
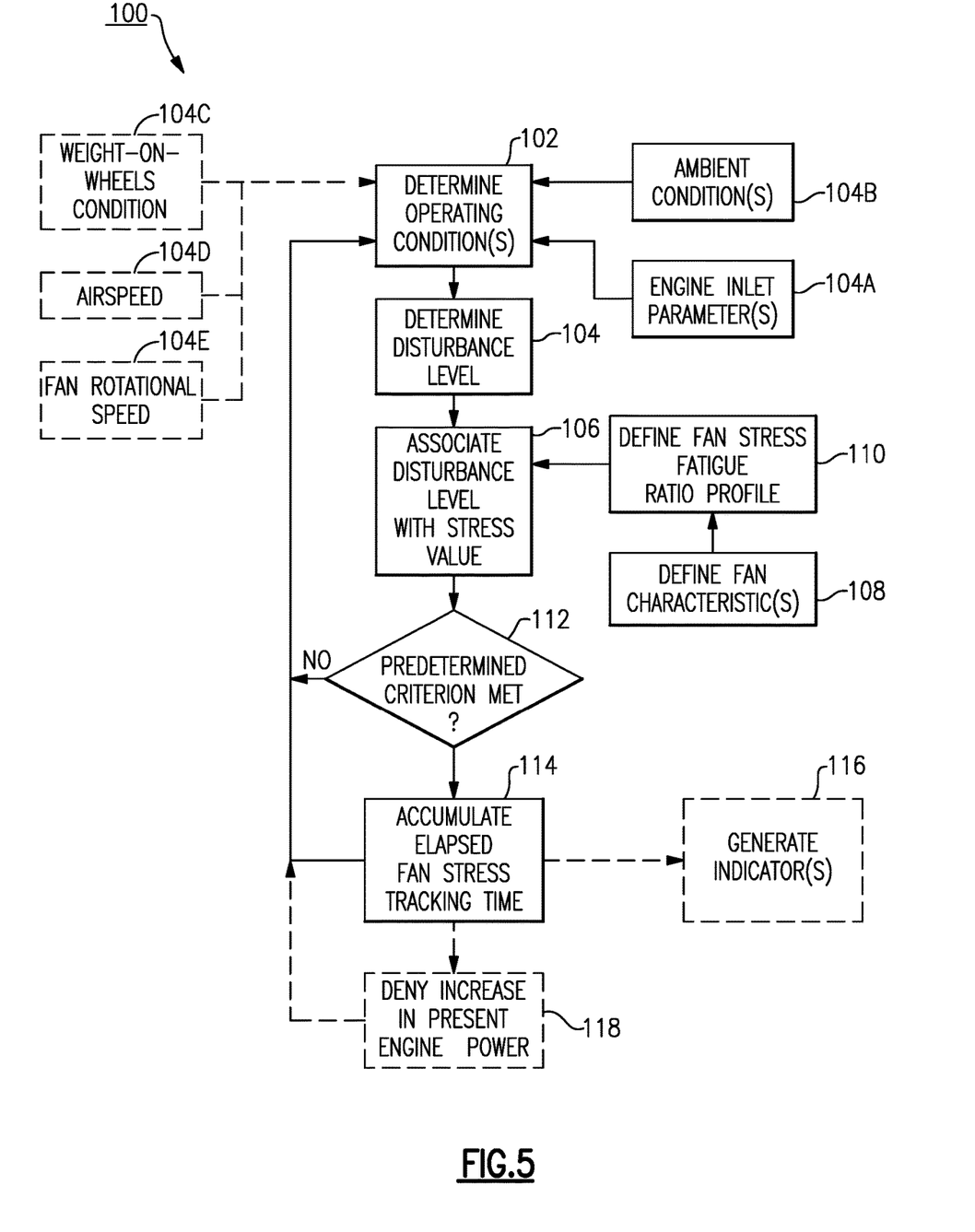
FIG. 5 illustrates a method for fan stress tracking, according to an embodiment.

FIG. 5 illustrates a flowchart in a method 100 for fan stress tracking which can be utilized with engine 20, fan section 22 and/or fan 42, according to an embodiment. Corresponding logic for performing method 100 can be implemented on controller 81, for example. At step 102, one or more operating conditions of the engine 20, including the fan section 22 and engine inlet 27, and/or aircraft are determined. Example operating conditions can include any of the operating conditions disclosed herein, including engine inlet parameter(s) 104A and ambient pressure(s) 104B. Other example operating conditions can include a weight-on-wheels condition 104C, airspeed (or ground speed) 104D and fan rotational speed 104E.

At step 104, a disturbance level is determined. Step 104 can include determining a difference between a sensed value of the engine inlet parameter and a sensed value of an ambient pressure parameter.

At step 106, the sensed value of an engine inlet parameter is associated with a stress value for fan 42 according to a FSFR profile. In some embodiments, one or more fan characteristics are defined at step 108. The FSFR profile can be defined with respect to the one or more fan characteristics at step 110.

At step 112, the method 100 determines whether the stress value meets at least one predetermined criterion, including any of the predetermined criteria discussed herein. At step 114, an elapsed fan stress tracking time is accumulated when the at least one predetermined criterion is met, such as when the stress value exceeds at least one FSFR and/or disturbance threshold. In some examples, step 114 includes accumulating a total elapsed time for two or more flight cycles, and with respect to each FSFR threshold. In some embodiments, one or more indicators are generated at step 116.

In one embodiment, at step 118 an increase in the present engine power of the engine 20 is denied when the stress value meets one or more of the predetermined criterion, or when the elapsed fan stress tracking time and/or total elapsed time exceeds a predetermined threshold. This may cause maintenance personnel to inspect or service the fan 42 prior to another flight cycle. In an alternative embodiment, step 118 include providing a pilot the option to abort takeoff of the aircraft or to override an alert.

Figure 6A:
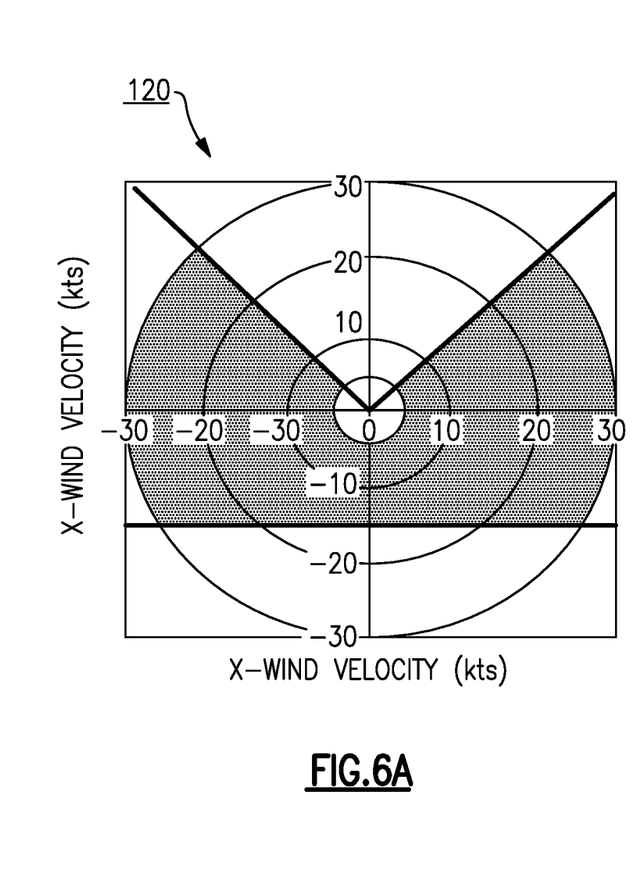
FIG. 6A illustrates a plot of fan operating modes with respect to wind velocity, according to a first embodiment.
Figure 6B:
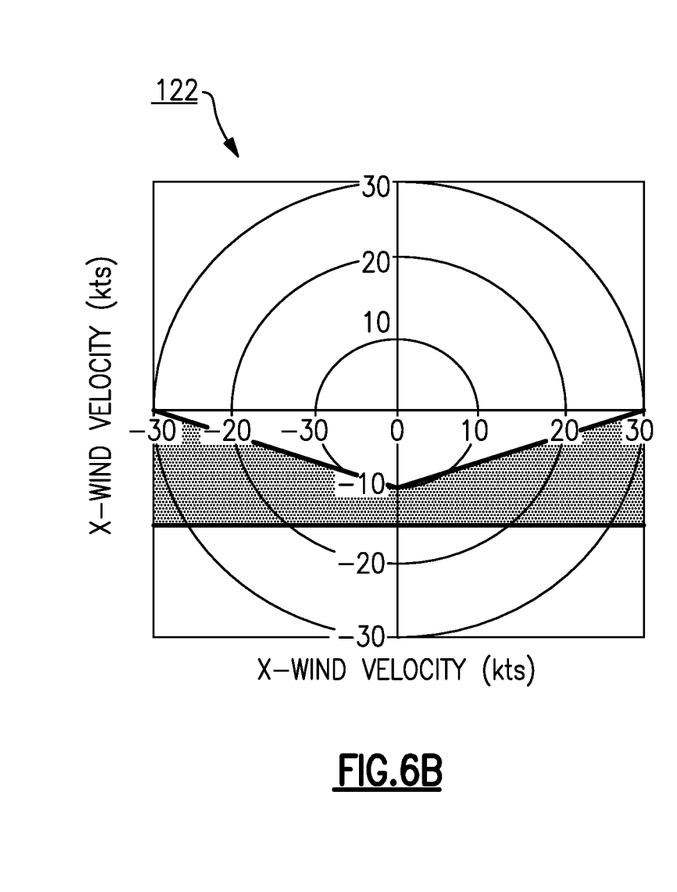
FIG. 6B illustrates a plot of fan operating modes with respect to wind velocity, according to a second embodiment.

FIGS. 6A and 6B illustrate plots 120, 122 of takeoff envelopes or fan operating modes with respect to crosswind velocity, expressed in knots (kts). Concentric rings illustrate increments of 10 knots, with values and wind direction being with respect to the engine 20. Unshaded areas of plots 120, 122 depict a takeoff envelope for conditions in which takeoff may be permitted. Shaded areas of plots 120, 122 depict conditions in which takeoff may not be permitted or restricted to a lower power takeoff. Plot 120 may correspond to operation of the engine without implementation of the fan stress tracking assembly 82, whereas plot 122 may correspond to operation of the engine with implementation of the fan stress tracking assembly 82. The reduced takeoff envelope of plot 120 may be based on assumptions of FSFR values that are not informed by sensed conditions during fan blade operation. As can be seen by a comparison of plots 120, 122, the fan stress tracking assembly 82 can increase the flight envelope based on evaluating sensed flight conditions.

Utilizing the techniques discussed herein, the FSFR of the fan blades 64 may be more accurately estimated based on sensed conditions of the fan 42 during engine operation. An increased flight envelope may allow takeoff under a greater number of operating conditions, including relatively strong crosswinds or tailwinds. The techniques discussed herein can also increase life of the fan blade by more accurately tracking exposure of the fan blades to potentially damaging crosswinds and tailwinds, and may more accurately define fan blade maintenance inspection and replacement intervals.

The controller 81 typically includes a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and the method 100 for operation of the controller 81 of this description. The interface facilitates communication with the other systems or components of the engine 20 or aircraft, for example. In some embodiments, the controller 81 is a portion of a full-authority digital electronic control FADEC or an electronic engine control (EEC), another system, or a stand-alone system located within the aircraft remote from the engine 20.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:
1. A system for fan stress tracking comprising:
    a computing device including memory and a processor, the computing device operable to execute a data module and a comparison module;
    wherein the data module is operable to access data corresponding to a sensed value of an engine inlet parameter, and is operable to access data corresponding to a fan stress fatigue ratio profile, the fan stress fatigue ratio profile defined with respect to at least one fan blade;
    wherein the comparison module is operable to associate the sensed value of the engine inlet parameter with a stress value according to the fan stress fatigue ratio profile;

wherein the engine inlet parameter corresponds to inlet pressure at a location in an engine inlet, and the fan stress fatigue ratio profile is defined with respect to a difference between the engine inlet parameter and an ambient pressure parameter;

wherein the comparison module is operable to determine whether the stress value meets predetermined criterion; and wherein the predetermined criterion includes a difference between the sensed value of the engine inlet parameter and a sensed value of the ambient pressure parameter exceeding at least one disturbance threshold.

2. The system as recited in claim 1, wherein the predetermined criterion includes at least one fan stress fatigue ratio threshold.

3. The system as recited in claim 2, wherein the at least one fan stress fatigue ratio threshold includes a first threshold corresponding to a fan stress fatigue ratio having a numerical value of less than 1.0.

4. The system as recited in claim 3, wherein the at least one fan stress fatigue ratio threshold includes a second threshold corresponding to a fan stress fatigue ratio of about 1.0.

5. The system as recited in claim 4, wherein the computing device denies an increase in engine power of an engine associated with the at least one fan blade in response to the stress value meeting the predetermined criterion.

6. The system as recited in claim 1, wherein the computing device is operable to execute an accumulator module, the accumulator module operable to accumulate an elapsed fan stress tracking time that the predetermined criterion is met.

7. The system as recited in claim 6, wherein the accumulator module is operable to accumulate a total elapsed time defined as the elapsed fan stress tracking time for each of two or more flight cycles.

8. The system as recited in claim 1, wherein the data module is operable to communicate with at least one probe operable to sense the inlet pressure.

9. A gas turbine engine comprising:
a fan section including a fan; and
a fan stress tracking assembly comprising:
at least one probe situated in the fan section;
a controller in communication with the at least one probe;
wherein the controller is operable to receive a sensed value of an engine inlet parameter relating to the engine inlet, is operable to associate the sensed value of the engine inlet parameter with a stress value according to a fan stress fatigue ratio profile, the fan stress fatigue ratio profile defined with respect to the fan, and is operable to determine whether the stress value meets predetermined criterion;
wherein the engine inlet parameter corresponds to inlet pressure at a location in the engine inlet, and the fan stress fatigue ratio profile is defined with respect to a difference between the engine inlet parameter and an ambient pressure parameter; and
wherein the predetermined criterion includes a difference between the sensed value of the engine inlet parameter and a sensed value of the ambient pressure parameter exceeding at least one disturbance threshold.

10. The gas turbine engine as recited in claim 9, wherein the location is axially forward of the fan with respect to the engine axis.

11. The gas turbine engine as recited in claim 9, wherein the predetermined criterion includes two or more fan stress fatigue ratio thresholds.

12. The gas turbine engine as recited in claim 11, wherein the two or more fan stress fatigue ratio thresholds include a first threshold, a second threshold and a third threshold, the first threshold corresponding to a fan stress fatigue ratio having a numerical value between 0.6 and 1.0, the second threshold corresponding to a fan stress fatigue ratio between 1.0 and 1.2, and the third threshold corresponding to a fan stress fatigue ratio having a numerical value of greater than 1.2.

13. The gas turbine engine as recited in claim 9, wherein the controller is operable to accumulate an elapsed fan stress tracking time that the predetermined criterion is met, and is operable to accumulate a total elapsed time, the total elapsed time being the elapsed fan stress tracking time for each of two or more flight cycles of the engine.

14. The gas turbine engine as recited in claim 9, wherein the predetermined criterion includes a weight-on-wheel condition and a predefined airspeed threshold of an aircraft associated with the engine, and a predefined rotational speed threshold of the fan.

15. The gas turbine engine as recited in claim 14, wherein:
the controller denies an increase in engine power of the gas turbine engine in response to the stress value meeting the predetermined criterion;
the predetermined criterion includes the stress value exceeding a fan stress fatigue ratio threshold, and the fan stress fatigue ratio is equal to or greater than 1.2; and
the at least one disturbance threshold is greater than or equal to 1.0 percent of the sensed value of the ambient pressure parameter.

16. A method of tracking fan stress for a gas turbine engine comprising:
providing a fan section including a fan;
associating a sensed value of an engine inlet parameter with a stress value for the fan according to a fan stress fatigue ratio profile, the engine inlet parameter corresponding to inlet pressure at a location in an engine inlet, the fan stress fatigue ratio profile defined with respect to a difference between the inlet pressure parameter and an ambient pressure parameter; and
determining whether the stress value meets predetermined criterion, wherein the predetermined criterion includes a difference between a sensed value of the engine inlet parameter and a sensed value of the ambient pressure parameter exceeding at least one disturbance threshold and wherein the predetermined criterion includes the stress value exceeding a fan stress fatigue ratio threshold, and the fan stress fatigue ratio threshold is equal to or greater than 1.0;
sensing both the sensed value of the engine inlet parameter and the sensed value of the ambient temperature parameter in a crosswind condition or a tailwind condition;
denying an increase in engine power of the gas turbine engine in response to the stress value meeting the predetermined criterion; and
permitting the increase in engine power of the gas turbine engine in response to the both the at least one disturbance threshold and the fan stress fatigue ratio threshold not being met.

17. The method as recited in claim 16, comprising defining the fan stress fatigue ratio profile with respect to one or more characteristics of the fan.

18. The method as recited in claim 16, comprising accumulating an elapsed fan stress tracking time when the predetermined criterion is met.

19. The method as recited in claim 16, wherein:
the at least one disturbance threshold is greater than or equal to 1.0 percent of the sensed value of the ambient pressure parameter, and the fan stress fatigue ratio threshold is equal to or greater than 1.2; and
the permitting step includes permitting the increase in engine power of the gas turbine engine in response to the at least one disturbance threshold not being met and the stress value being greater than 1.0 but less than the fan stress fatigue ratio threshold.

* * * * *